United States Patent
Plante

(10) Patent No.: US 7,270,082 B2
(45) Date of Patent: Sep. 18, 2007

(54) PET DRINKING FOUNTAIN

(75) Inventor: Robin Plante, Sainte-Barbe (CA)

(73) Assignee: Rolf C. Hagen, Inc., Montreal, Quebec (CA)

(*) Notice: Subject to any disclaimer, the term of this patent is extended or adjusted under 35 U.S.C. 154(b) by 22 days.

(21) Appl. No.: 11/396,870

(22) Filed: Apr. 3, 2006

(65) Prior Publication Data

US 2006/0174838 A1    Aug. 10, 2006

Related U.S. Application Data

(63) Continuation-in-part of application No. 10/757,100, filed on Jan. 14, 2004, now Pat. No. 7,089,881.

(60) Provisional application No. 60/713,427, filed on Sep. 1, 2005.

(51) Int. Cl.
*A01K 7/02* (2006.01)
(52) U.S. Cl. ...................................................... 119/74
(58) Field of Classification Search ............. 119/51.01, 119/51.5, 72, 74, 77, 78, 79, 80; 239/23; D30/121, 129, 130, 131, 132, 133
See application file for complete search history.

(56) References Cited

U.S. PATENT DOCUMENTS

| | | | |
|---|---|---|---|
| 3,409,223 A | 11/1968 | Gosh |
| 3,901,191 A | 8/1975 | Smith |
| 4,721,063 A | 1/1988 | Atchley |
| 4,836,142 A | 6/1989 | Duback |
| 4,840,143 A | 6/1989 | Simon |
| 4,844,014 A | 7/1989 | Gershman |
| 4,976,220 A | 12/1990 | Gershman |
| 5,167,368 A | 12/1992 | Nash |
| 5,259,336 A | 11/1993 | Clark |
| 5,326,032 A | 7/1994 | Quillin |
| 5,501,178 A | 3/1996 | Kemp |
| 5,799,609 A | 9/1998 | Burns et al. |
| 5,809,934 A | 9/1998 | Gavet |
| 5,842,437 A | 12/1998 | Burns |
| 6,055,934 A | 5/2000 | Burns et al. |
| 6,079,361 A | 6/2000 | Bowell et al. |
| 6,101,974 A | 8/2000 | Frohlich |
| 6,149,070 A | 11/2000 | Hones |
| 6,257,560 B1 | 7/2001 | Kim |
| 6,450,122 B1 | 9/2002 | Frank |
| 6,460,483 B1 | 10/2002 | Northrop et al. |
| 6,463,880 B1 | 10/2002 | Callingham |
| 6,467,428 B1 | 10/2002 | Andrisin et al. |
| 6,526,916 B1 | 3/2003 | Perlsweig |
| 6,527,257 B1 | 3/2003 | Schuld |
| 6,622,657 B2 | 9/2003 | Northrop et al. |
| 6,640,747 B2 | 11/2003 | Reusche |
| 6,848,629 B2 | 2/2005 | Palmer |
| 2004/0118356 A1 | 6/2004 | Krishnamurthy |
| 2004/0262417 A1 | 12/2004 | Proch |

*Primary Examiner*—T. Nguyen
(74) *Attorney, Agent, or Firm*—Wolf Greenfield & Sacks

(57) ABSTRACT

A drinking fountain for pets has a base with a water receptacle therein and a dome-shaped reserve water tank on the base. A drinking bowl on the top of the tank and a pump system for conveying water in the receptacle to the drinking bowl. Water pumped into the bowl overflows the bowl and flows down over a portion of the surface of the reserve water tank and returns to the receptacle. When the water in the receptacle falls below a predetermined level, water from the reserve tank automatically flow from the tank to the receptacle to increase the water to the prescribed level.

16 Claims, 4 Drawing Sheets

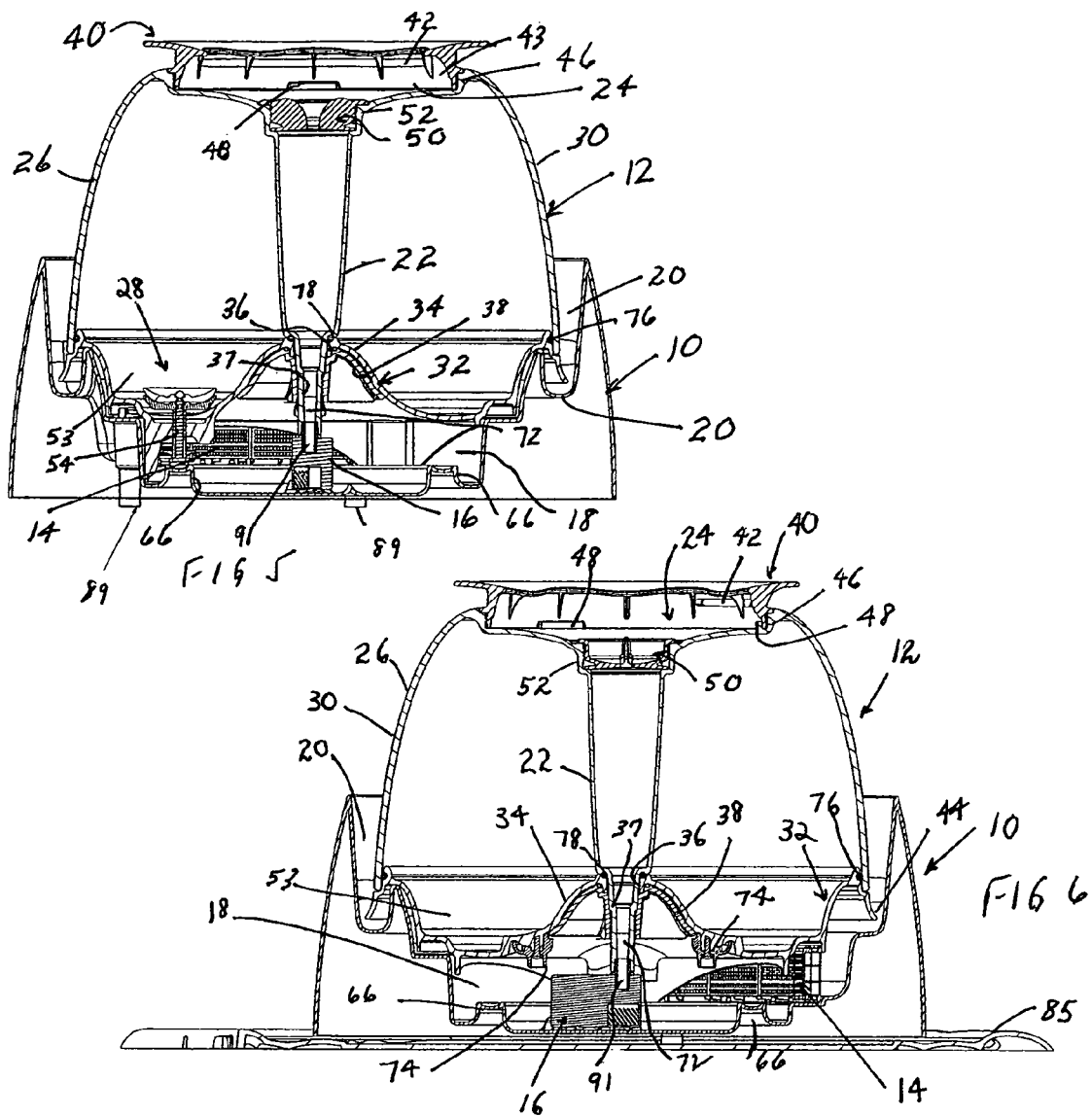

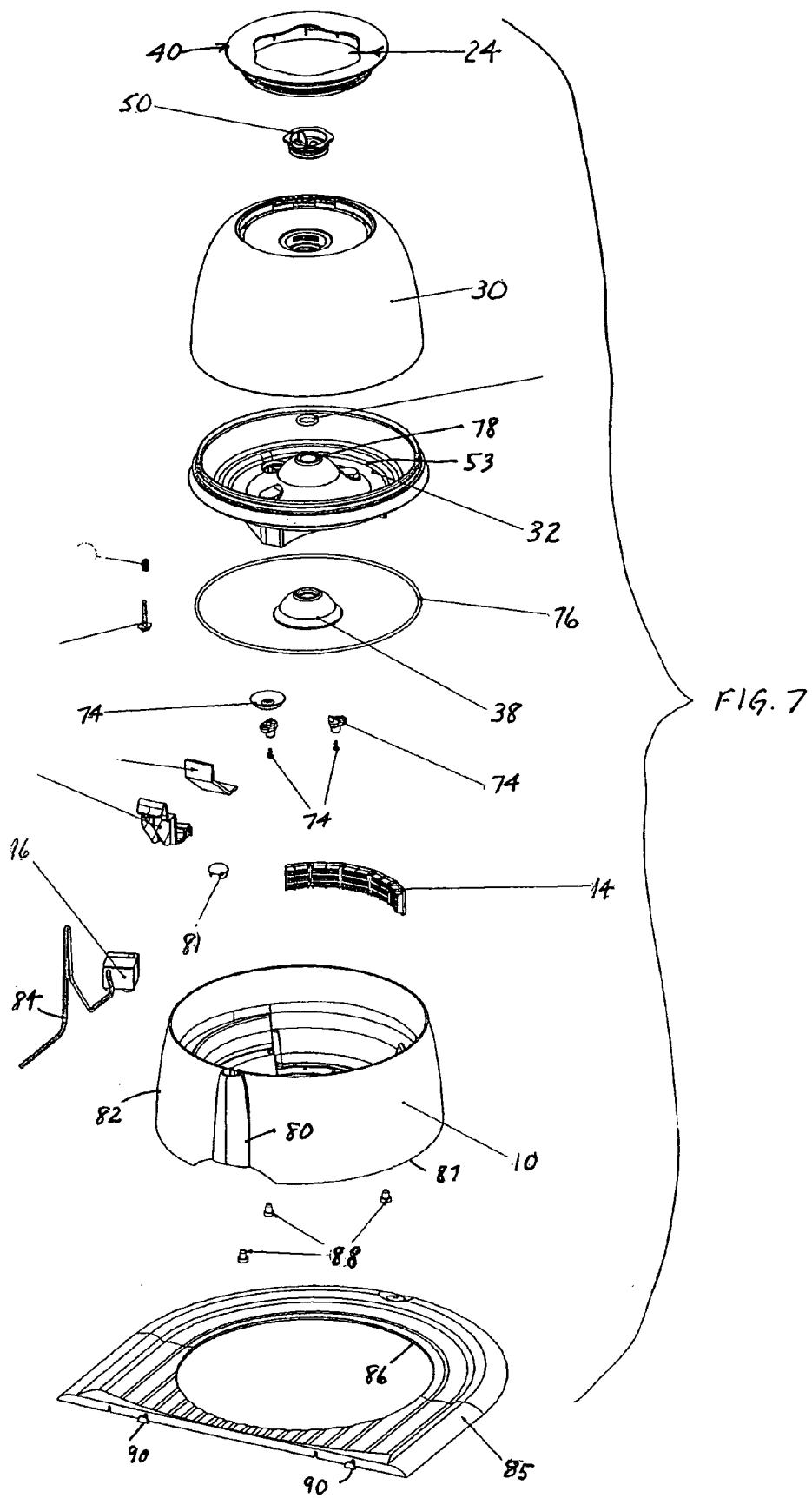

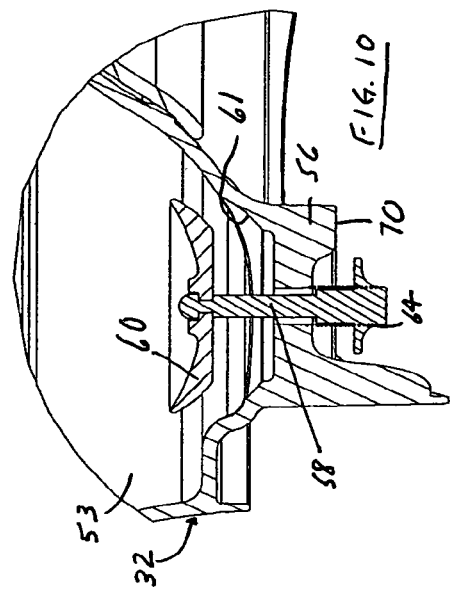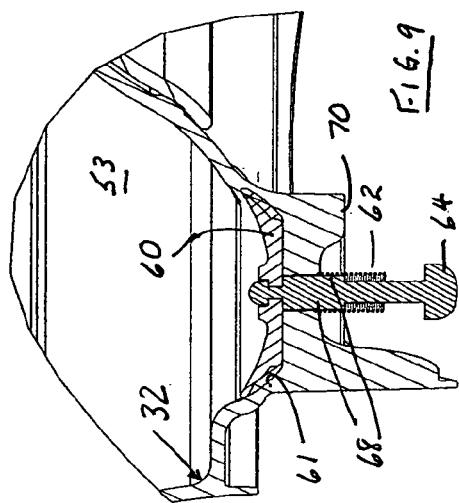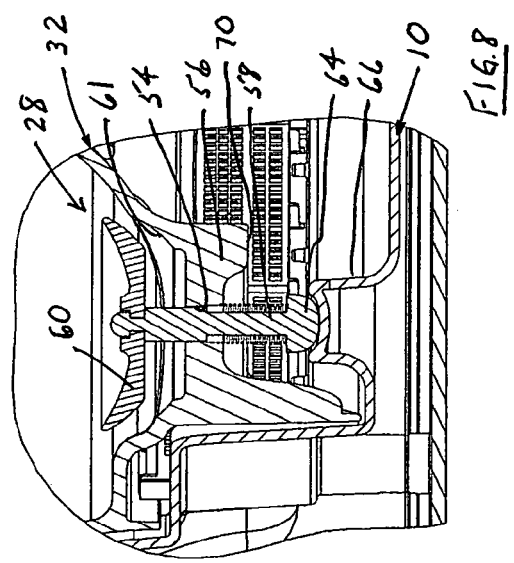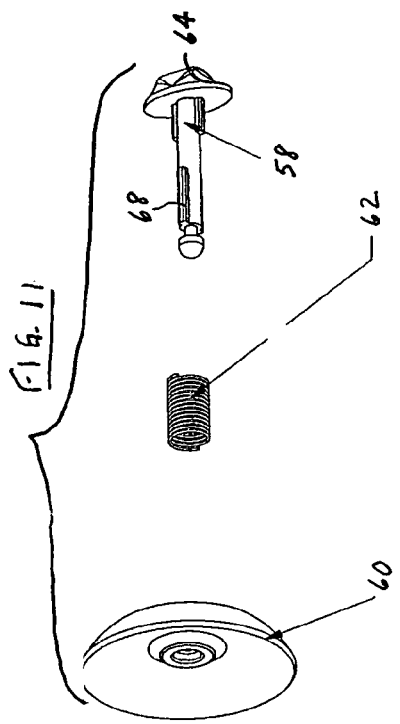

PET DRINKING FOUNTAIN

RELATED APPLICATIONS

This application claims priority under 35 U.S.C. § 119(e) to U.S. Provisional Application Ser. No. 60/713,427, entitled "Pet Drinking Fountain," filed on Sep. 1, 2005, which is herein incorporated by reference in its entirety.

This application is a Continuation-In-Part of and also claims the benefit under 35 U.S.C. § 120 of U.S. application Ser. No. 10/757,100, entitled "Pet Drinking Fountain," filed on Jan. 14, 2004, now U.S. Pat. No. 7,089,881 which is herein incorporated by reference in its entirety.

BACKGROUND OF INVENTION

Field of Invention

This invention relates to drinking apparatus for pets such as dogs and provides continuously circulating water that may be drunk from a bowl or lapped from a sloped surface.

SUMMARY OF THE INVENTION

The drinking fountain of the present invention provides continuously circulating fresh, clean water that may be replenished from a reservoir that is part of the fountain, when the circulating water falls below a prescribed level. The water in the reservoir does not mix with the circulating water but rather water from the reservoir is periodically fed to the circulating water to replenish the water that has been consumed, spilled or evaporated.

In accordance with one aspect of the invention the water circulation system includes an elevated drinking bowl in a comfortable drinking position, and the water from the bowl runs down a surface from which it may be lapped by a dog or other animal. The water on the surface that is not consumed ultimately returns via a stand pipe to the drinking bowl in a continuous flow pattern. This arrangement provides a large surface area for greater water oxygenation. The elevated drinking bowl also encourages pets with arthritis and/or muscle and joint problems to drink more water. In accordance with one embodiment, the drinking bowl provided at the top of the fountain is approximately 300 millimeters above the ground and the reservoir holds approximately 10.5 liters. Obviously the fountain may be made in different sizes to accommodate different requirements, i.e. larger or smaller animals.

In accordance with another aspect of the invention, the reservoir may conveniently be refilled by simply removing it from its base and removing the reservoir cover.

In accordance with yet another aspect of the invention, a splash guard is integrated into the structure to reduce water spillage from the drinking bowl, and the guard also serves as a handle for carrying the entire fountain structure and/or the reservoir.

In accordance with yet another aspect of the invention, the reservoir can turn 360° on the fountain base to direct the flow from the drinking bowl down any peripheral direction of the reservoir structure. By turning the reservoir, the flow on the surface may be directed away from the position normally occupied by the dog drinking from the bowl so that long-haired dogs and other pets will not get wet. For short-haired dogs and other pets such as cats and smaller dogs, the water flow on the bowl surface is attractive to them, and the location of flow on the surface is of no concern. Thus, the fountain is suitable for use by a variety of different pets.

DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIG. 5 is a cross-sectional elevation view of the pet drinking fountain removed from its tray and taken along the section line 5-5 in FIG. 2;

FIG. 6 is a cross-sectional elevation view of the fountain taken along section line 6-6 in FIG. 2;

FIG. 7 is an exploded perspective view of the pet drinking fountain;

FIG. 8-10 are fragmentary cross-sectional views of one embodiment of a valve system through which water in the reservoir tank is allowed to flow into the base receptacle to maintain the continuous circulation of water in the drinking fountain; and FIG. 11 is an exploded perspective view of the valve, stem and spring of the valve system shown in FIGS. 8-10.

DESCRIPTION

Figure 3:
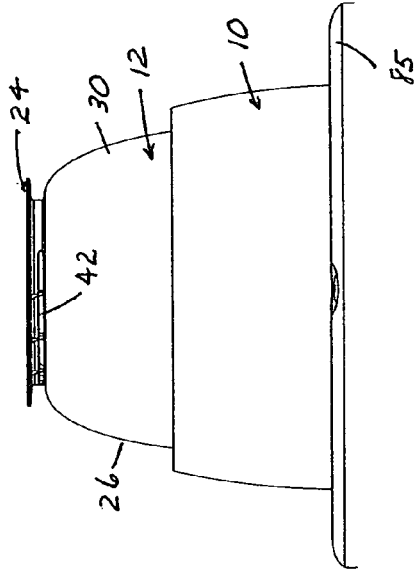
FIGS. 3 and 4 are front and side elevation views thereof.

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

Figure 1:
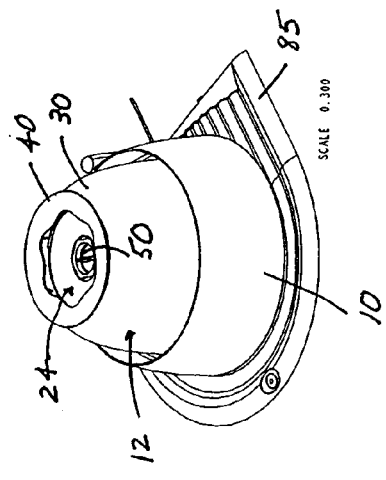
FIG. 1 is a perspective view of one embodiment of the pet drinking fountain constructed in accordance with the present invention.
Figure 2:
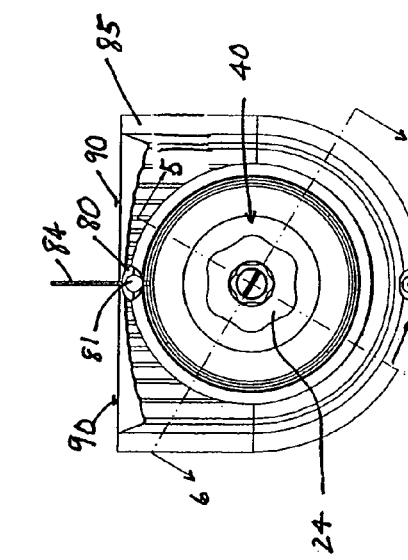
FIG. 2 is a top plan view thereof.

The pet drinking fountain of the present invention includes in its general organization, a base 10, a tank assembly 12, a filter 14, and a pump 16 (see FIGS. 1, 5 and 6). The base 10 includes a receptacle 18, a gutter 20 and a skirt 21, that may be integral with one another as shown or formed separately and subsequently attached together. The tank assembly 12 includes a standpipe 22 connected at its bottom end to the pump 16 that delivers water from its upper end to an elevated drinking bowl 24 formed on the top of the tank. Water from the bowl 24 discharges onto a limited area on the external surface 26 of the tank, and the water collects in the gutter 20 that in turn directs the water into the base receptacle 18 via the filter 14. Under normal operating circumstances, there is a continuous flow of water from the receptacle 18 through the pump 16 and standpipe 22, into the bowl 24 and down the surface 26 of the tank assembly 12 and via the gutter 20 and filter 14 to the receptacle 18. The flow may, however, be interrupted by shutting off the pump.

The tank assembly 12 serves as a reservoir of water for the drinking fountain. The reservoir preferably has a capacity of ten or more liters, and the water in the reservoir replenishes the water circulating in the system when it falls below a certain level established by a valve system 28 that is responsive to a drop in the water level in the receptacle 18. The volume of circulating water diminishes as it is consumed, spills and/or evaporates, and it is replenished from the reservoir. The various components of the assembly are described in greater detail below.

The tank 12 includes a dome-shaped top 30 (sometimes hereinafter called a dome) and a bottom cover 32. The cover 32 has a dome-shaped central portion 34 with an opening 36 centrally located at the top of the dome, through which standpipe 22 that is formed as an integral part of the dome 30, extends. In the cross-sectional views of FIGS. 5 and 6 it may be observed that the lower portion 37 of standpipe 22 is threaded into the dome 34 below the opening 36. The threaded section of the standpipe cooperates with a retainer 38 disposed within the dome 34 of the bottom cover to retain the tank top 30 and bottom cover 32 assembled together in the relationship shown in the drawings. It should be noted that the top of the tank is closed, that is, there are no openings that allow air to enter the top of the tank above water stored in it. While the preferred means for connecting the dome 30 and cover 32 are described, the parts may be assembled by other means as well.

The tank assembly 12 includes a handle 40 that is connected to the top of the dome 30 and in part defines the side walls of the bowl 24. As shown in FIGS. 3, 5, and 6 and in accordance with one aspect of the invention, an opening 42 is provided in the skirt 43 of the handle 40 that allows water to flow out of the drinking bowl 24 and down over a selected portion of the surface 26 of the dome 30. The water discharged through the opening 42 will flow down the surface 26 into the trough 20 and the water in the trough in turn will exit through the opening 44 (see FIG. 6) and flow through the filter 14 in the base 10 into the receptacle 18. The opening 42 directs the water over a portion of the surface 26 while the remaining portion is free of flowing water and remains relatively dry. Many long-haired dogs and other pets that may drink from the fountain prefer not to have their fur become wet when drinking from the bowl 24, and if the bowl is approached from the dry side, the animal will not get wet from the flowing water. Some dogs as well as other animals may prefer to drink the water flowing from the surface 26 rather than lapping the water from the bowl. The preferences of a variety of animals are accommodated by this feature of the invention.

The handle 40 in the embodiment shown is threaded into the side wall 46 of the recess formed in the top of the dome as part of the drinking bowl, and ribs 48 are shown, particularly in FIGS. 5 and 6, that increase the stiffness of the skirt 43 to insure that the engagement of the handle to the dome is maintained. It will be appreciated that the handle may be mounted in other ways as well. For example, the handle may be permanently secured in place on the tank or it may be secured by other types of fasteners.

In accordance with another aspect of the invention, a reducer 50 is mounted at the top of the stand pipe 22 as shown in FIGS. 5 and 6. While it is shown threaded into the top portion 52 of the pipe, it may be attached in other ways such as with a snap fit. The reducer is somewhat flower-shaped and is provided to create motion in the water feeding into the drinking bowl 24 from the stand pipe. Without a reducer, very little movement of the water in the bowl 24 would be discernable. The moving water in the drinking bowl ensures against water stagnation and creates a visual identifier that the fountain is working. The reducer shown creates a small protrusion of water above the surface which also may readily be observed.

The bottom cover 32 of the tank assembly 12 has a circumferentially-extending depressed area 53 that surrounds the bottom cover dome 34 and contains the valve system 28 that allows water to flow from the tank into the receptacle 18 in the base 10. The functioning positions of the valve system are shown in FIGS. 8-10. The system 28 includes a passage 54 connecting the depressed area 53 to the receptacle. The passage 54 is surrounded by a collar 56 and supports a valve stem 58 that carries a dish-shaped valve 60. The valve 60 controls the flow of water from the interior of the tank through the passage 54 to the receptacle. The valve system is biased to a closed position by a coil spring 62 that bears against the bottom of the collar 56 and the head 64 of the valve stem 58. When no external axially directed force is applied to the stem, spring 62 will move the valve to the closed position. The valve system 28 is automatically opened, however, when the tank assembly is placed in position on the base 10 by an annular shoulder 66 formed in the receptacle 18 of the base. As shown in FIGS. 5 and 8, the head 64 of the stem 58 engages the shoulder 66 forcing the stem upwardly against the bias of the spring 62 to unseat the valve 60 when the tank 30 is seated on the base 10. When the tank assembly is removed from the base, the spring 62 automatically closes the valve 50 to in turn close the passage 54 so that no water can flow from the tank. In FIG. 10, the valve 60 is shown locked in the open position, that is, the valve 60 is raised off the valve seat 61 above the collar 56. This is achieved by manually moving the valve to the open position and thereafter rotating the stem 58 so that ribs 68 (see also FIGS. 8 and 11) formed longitudinally on the stem are misaligned with slots 63 in the passage 54 and engage the top of collar 56. To release valve 60 to the bias imposed by spring 62, the valve is rotated 90 degrees back to the position shown in FIG. 8 so as to align the ribs 68 with the slots 63, and the valve will close. Other expedients as well may be used to hold the valve open such as detents, clamps, spring-loaded pins, etc.

When the tank assembly is placed on the base, the valve 60 is automatically opened so as to allow water to flow from the tank into the receptacle 18 in the base 10, until the level of the water in the receptacle rises above lower surface 70 of collar 56, which will prevent additional air from flowing into the tank assembly through the passage 54. The interior of the tank assembly is sealed as there are no openings in the dome surface that allow air to enter the space above the water level in the dome. However, when the level of water in the receptacle drops below the surface 70, water in the tank will flow through the passage 54 and air simultaneously will flow in the opposite direction through passage 54 into the tank assembly. Water will continue to exit from the tank through the passage 54 and into the receptacle 18 until the height of the water in the receptacle again reaches the bottom surface 70 of the collar 56 to seal the passage 54. It will be appreciated that the surface of the water in the receptacle 18 is exposed to ambient pressure, and when the water rises above the level of surface 70 to seal the passage, flow of water from the tank to the well ceases as the pressure above the water in the tank equalizes with the ambient pressure in the receptacle of the base 10.

The tank assembly may periodically be filled by removing it from the base 10 with the aid of the handle 24 and removing the retainer 38 by unscrewing it from the stem 72 of the standpipe 22 so that the cover 32 may be separated from the dome 30. In accordance with yet another aspect of this invention, a pair of extractors 74 are mounted on the under side of the bottom cover or base 32 of the tank (see FIG. 6) to assist in that operation. The extractors 74 are shown to overlap the lower edge 75 of retainer 38 and, therefore, when the retainer is unscrewed from the stem 72 of the standpipe, the dome 30 of the tank assembly will be forced away from the retainer so as to break the seals formed by the O-rings 76 and 78 at the juncture of the dome 30 and cover 32 and the juncture of the standpipe 22 and cover 32, respectively.

Figure 4:
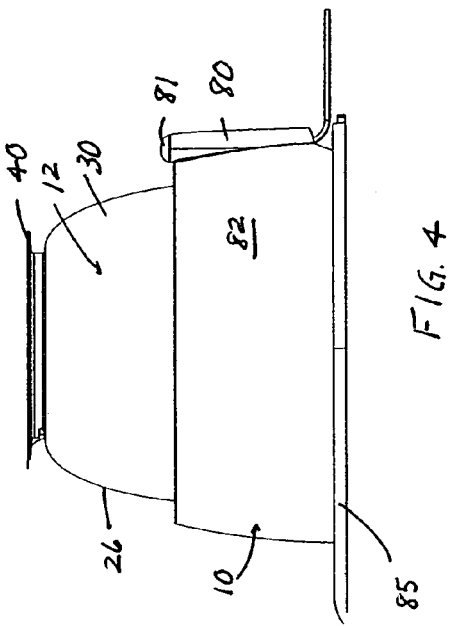

Shown in FIGS. 4 and 7, in accordance with another aspect of the invention, is an enclosure 80 in the form of a sleeve along with a cap 81, provided on the surface 82 of the base, to house the power cord 84 of pump 16. The enclosure 80 confines the cord so that it will not accidentally be engaged by or get entangled with a dog or other animal using the fountain.

Another aspect of the present invention is the provision of a tray or mat 85 that has a central opening 86 sized to receive the lower edge 87 of the skirt 21 of base 10 of the drinking fountain (see FIG. 7). The tray 85 along with the feet 88 serve to stabilize the drinking fountain and resist it from sliding on the floor. The mat 85 will also serve, by virtue of its top surface that is inclined toward the opening 86, to prevent water that splashes from the bowl 24 or dome surface 26 from spreading about the floor. The mat shown is also provided with fasteners 90 that may be employed to connect the mat with another identical mat so that a pair of fountains may be used together in side-by-side relationship. The pair of mats will prevent the fountains from separating.

In use, to fill the tank, the tank assembly 12 is removed from the base 10 and inverted, the bottom cover 32 of the tank assembly is separated from the dome 30, and the dome may be placed in an inverted position. The handle 40 may serve as a stand for the tank during the filling operation. The handle also serves as a baffle to reduce spillage of water from the drinking bowl 24 when the tank is disposed in the upright position. After the tank is filled, the bottom cover 32 is reattached to the dome 30 by placing the cover on the dome and securing it in position by screwing the retainer 38 onto the stem 22. Because the valve 28 automatically closes when no contrary force is applied to the valve stem 58, the tank assembly may be turned upright and be carried by the handle 43 and placed in position on the base 10. No special circumferential relationship is required of the tank assembly 12 with respect to the base 10 as the bottom of the stem of the stand pipe will be centered on the discharge duct 91 of the pump 16. Furthermore, because the shoulder 66 extends 360° about the base 10 at a constant radius from the axis of the tank assembly 12, the valve stem head 64 will engage the shoulder 66 regardless of the circumferential relationship of the tank assembly to the base. Assuming there is no water in the receptacle 18 of the base, when the tank is placed in position and the valve 28 is opened by engagement of the valve stem head 64 with the shoulder 66, water will flow from the tank through the passage 54 into the receptacle 18. However, when the water in the receptacle reaches the surface 70 of the valve collar 56, no further air will be permitted to flow into the tank through the passage 54, and the pressure in the tank will reach the ambient pressure on the surface of the water in the receptacle 18. By merely plugging in the power cord 84 of pump 16, circulation of water will begin and very quickly the drinking bowl 24 will fill. During the filling operation of the drinking bowl 24, the level of the water in the receptacle of the base will drop causing small quantities of water to flow from the tank assembly 12 into the base receptacle 10 until the system stabilizes. Thereafter, only when the level of water in the receptacle drops below the surface 70 of the valve collar will water flow from the tank 30 into the receptacle 18. The decrease in level of water in the receptacle will, however, periodically occur from evaporation and/or consumption of water by a pet.

The major parts of the fountain may typically be molded of a plastic material such as general purpose polystyrene, polypropylene, elastomers, PVC, etc.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A pet drinking fountain comprising
    a base and a water supply tank having a closed generally dome-shaped top disposed on the base and extending upwardly therefrom,
    a water collection area in the base disposed beneath the tank,
    a channel substantially surrounding the bottom portion of the dome-shaped tank top,
    a drinking bowl on the top of tank from which a pet may drink,
    a water pump disposed in the collection area and connected to a duct directs water in the area to the drinking bowl and to overflow the drinking bowl onto the upper portion of the tank and spill down over the outer surface of the tank and into the channel,
    and a discharge passage in the lower portion of the tank top communicating with the base enables water in the tank to flow to the collection area of the base when the water in the base falls below a predetermined level.

2. The pet drinking fountain as described in claim 1 wherein a filter is mounted in the collection area and filters water in the base before it is drawn into the pump.

3. The pet drinking fountain as described in claim 2 wherein the duct extends from the pump upwardly through the tank to the bowl on the dome-shaped top.

4. The pet drinking fountain as described in claim 1 wherein the pump is continuously driven by an electric motor.

5. The pet drinking fountain as described in claim 1 wherein the dome-shaped top has a smooth outer surface allowing the water to flow smoothly toward the base.

6. A pet drinking fountain as described in claim 1 wherein the drinking bowl is formed in the top of the tank.

7. The pet drinking fountain as described in claim 1 wherein the flow of overflow water is confined to a portion of the circumference of the dome.

8. The pet drinking fountain as described in claim 1 wherein access is provided for the pet to the drinking bowl without contacting water flow down the surface of the tank enabling the pet to drink water in the bowl without getting its fur wet.

9. A device for providing drinking water to pets comprising,
    a drinking bowl for receiving water and from which pets may drink,
    a water circulation system including a water chamber separate from the bowl and means enabling water to flow from the bowl to the chamber,
    a reserve water tank for supplying additional water to the system when the water level falls below an established level in the chamber, said tank having a dome-shaped top with at least a portion thereof having a smooth surface over which the water flows from the bowl to the chamber, said tank supporting the drinking bowl at the top of the tank, and pump means in the system for discharging water from the chamber into the drinking bowl and from the drinking bowl the smooth surface.

10. The device for providing drinking water to pets as described in claim 9 wherein the tank includes a removable bottom cover attached to the dome-shaped top for enabling the tank to be filled when the tank is inverted and the cover removed.

11. The device for providing drinking water to pets as described in claim 10 wherein a handle is connected to the dome-shaped top for lifting the tank.

12. The device for providing drinking water to pets as described in claim 11 wherein the handle provides a support for the tank when the tank is inverted.

13. The device for providing drinking water to pets as described in claim 9 wherein the tank includes valve means for enabling water to flow from the tank to the chamber,
   means responsive to mounting the tank in the system for opening the valve means,
   and means for controlling pressure in the tank for preventing water in the tank flowing out the valve means to the chamber when the valve means is open.

14. The device for providing drinking water to pets as described in claim 9 wherein the pump means is in continuous operation when the tank is in the system.

15. A pet drinking fountain comprising
   a base and a water supply tank mounted on the base,
   a drinking bowl open at the top and formed externally on the top of the tank,
   a handle attached to the tank for carrying the tank,
   a receptacle disposed in the base,
   a duct communicating with the receptacle conveys water from the receptacle to the bowl,
   a reducer in the top of the duct creates turbulence in the bowl as water is discharged from duct to the bowl,
   an opening in the bowl permits water in the bowl to flow other than through the duct to the receptacle,
   a pump in the receptacle for continuously circulating water from the receptacle up the duct into the bowl and causes water in the bowl to flow through the opening back into the receptacle,
   and a valve system connecting the tank to the receptacle enables water from the tank to flow into the receptacle when the level of water in the receptacle falls below a predetermined level.

16. The drinking fountain of claim 15 wherein
the handle defines part of the bowl and contains the opening.

\* \* \* \* \*